J. E. McMEEN.
CABLE TERMINAL.
APPLICATION FILED MAY 21, 1906.
905,347.
Patented Dec. 1, 1908.
5 SHEETS—SHEET 1.
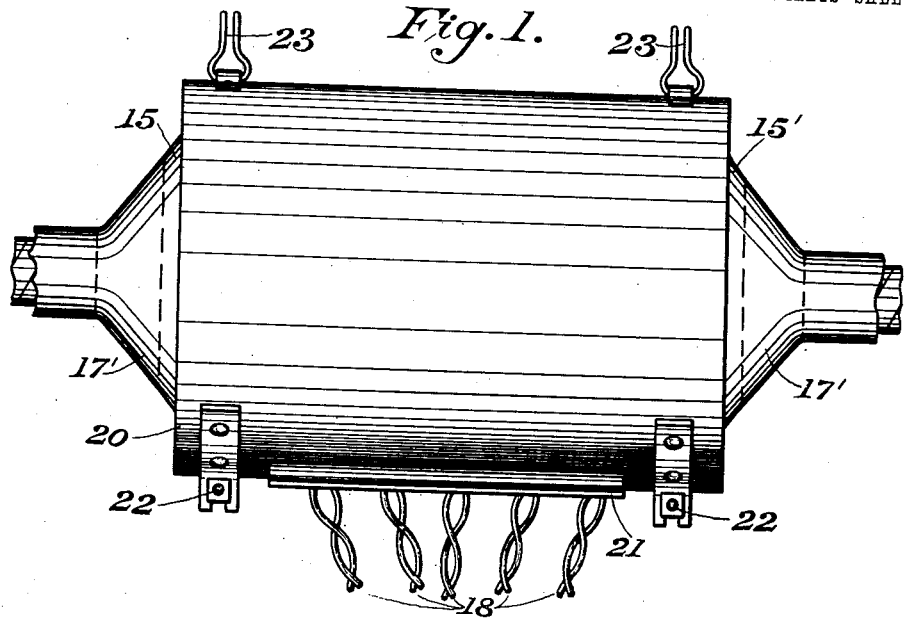
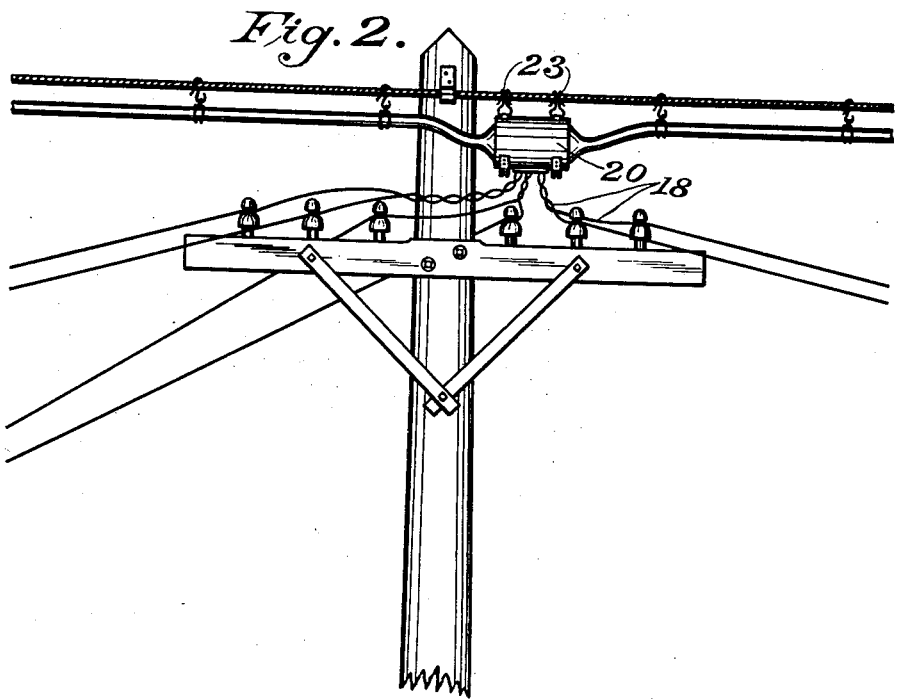
Witnesses:
Hazael C. Prado.
David S. Hulfish.
James E. McMeen,
Inventor,
by Samuel G. McMeen
Attorney.

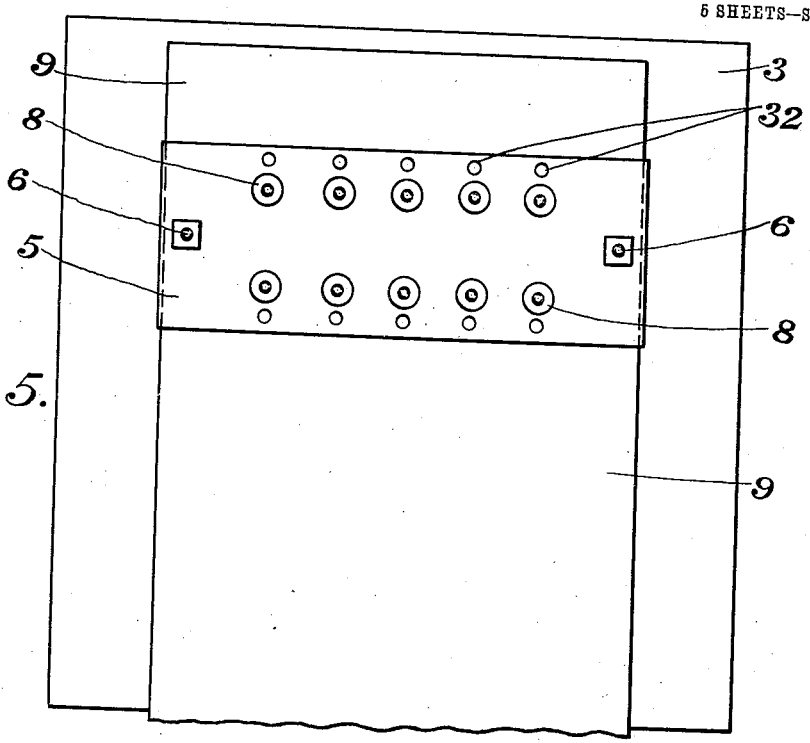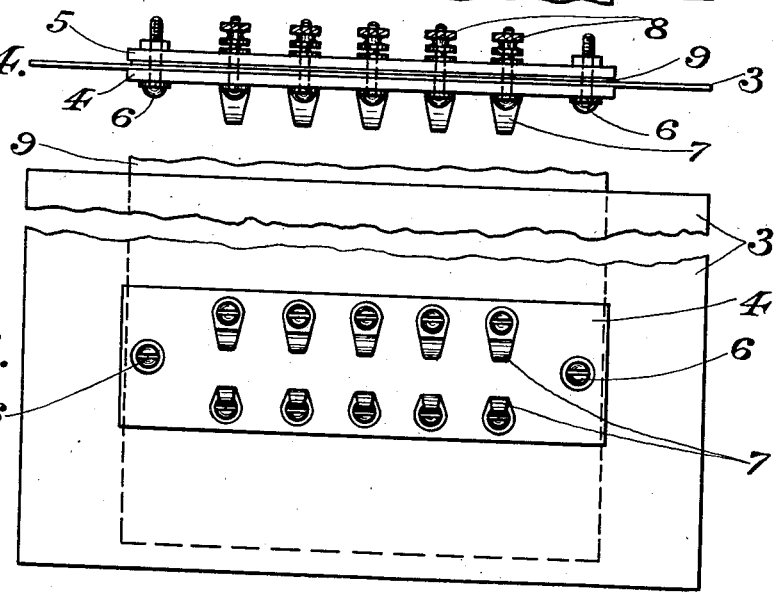

J. E. McMEEN.
CABLE TERMINAL.
APPLICATION FILED MAY 21, 1906.
905,347.
Patented Dec. 1, 1908.
5 SHEETS—SHEET 3.
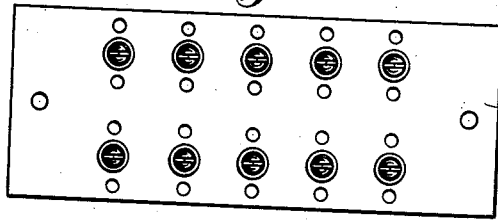
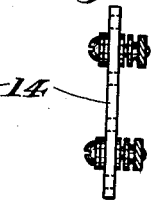
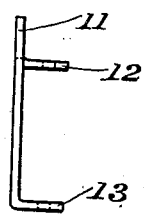
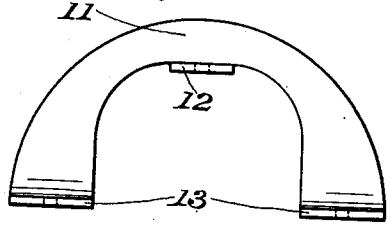
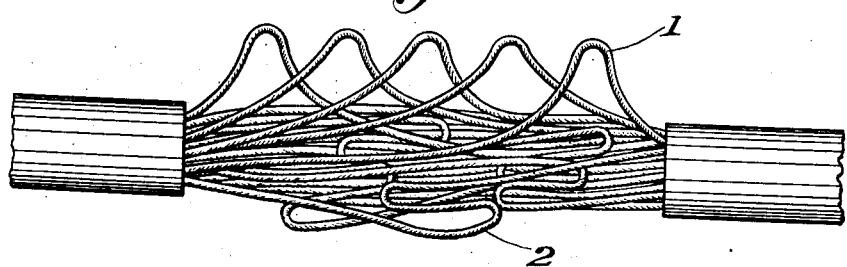
Witnesses:
Harael C. Prado.
David S. Hulfich
James E. McMeen,
Inventor.
by Samuel G. McMeen
Attorney.

J. E. McMEEN.
CABLE TERMINAL.
APPLICATION FILED MAY 21, 1906.

905,347.

Patented Dec. 1, 1908.
5 SHEETS—SHEET 4.

Witnesses:
Hazael C. Prado
David S. Hulfish

James E. McMeen,
Inventor.
by Samuel G. McMeen
Attorney.

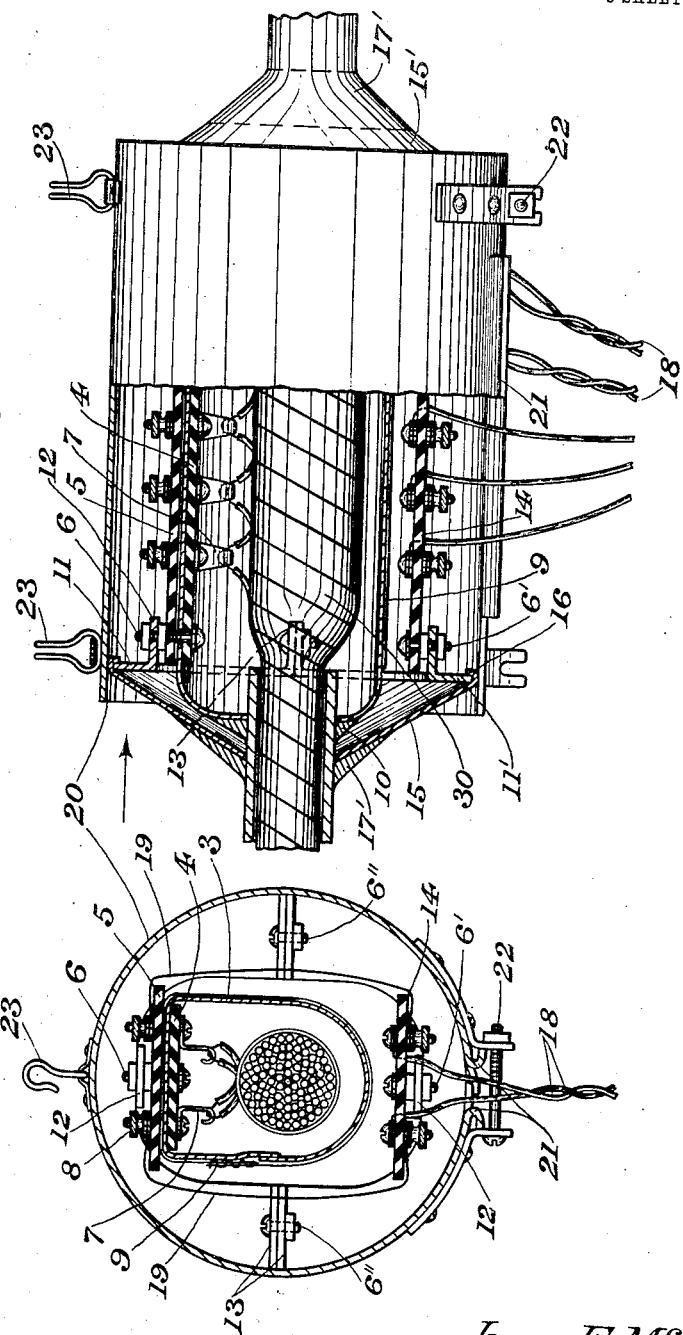

UNITED STATES PATENT OFFICE.

JAMES E. McMEEN, OF GALESBURG, ILLINOIS.

CABLE-TERMINAL.

No. 905,347.  Specification of Letters Patent.  Patented Dec. 1, 1908.

Application filed May 21, 1906. Serial No. 317,981.

*To all whom it may concern:*

Be it known that I, JAMES E. MCMEEN, a citizen of the United States of America, and a resident of Galesburg, county of Knox, and State of Illinois, have invented a new and useful Improvement in Cable-Terminals, of which the following is a specification.

My invention pertains to the installation and maintenance of electrical conductors in cables, particularly such conductors as are inclosed in lead-covered cables, and hung upon poles for the distribution of telephone circuits, wherein it is desirable to make certain of the cable conductors accessible at various points throughout the length of the cable.

My invention consists of an improved and simplified cable terminal device, my device being built directly upon the cable itself instead of being built as a piece of apparatus apart from the cable, with a branch of the cable leading to it and terminating in it.

The advantages of my method of terminating or tapping cable conductors lie in the direction of economy, as a terminal according to my invention is very cheap to install, either at the time the cable is erected or at any subsequent time.

Figure 11:
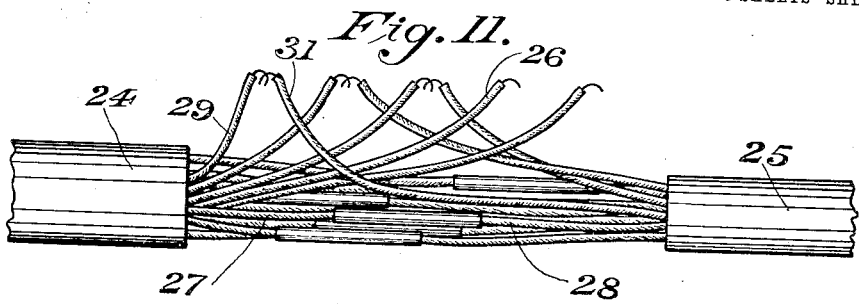
Figure 12:
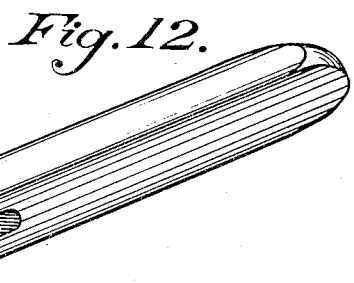
Figure 13:
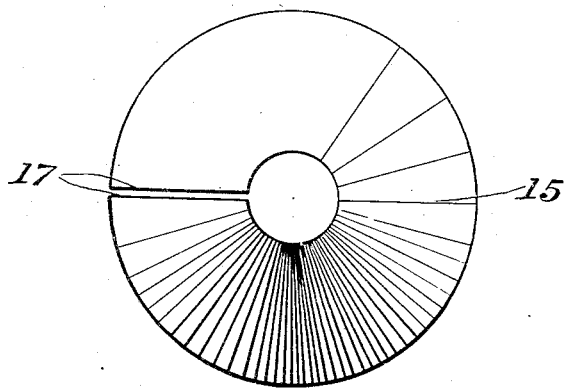
Figure 14:
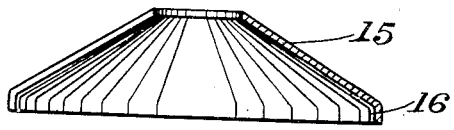

In the drawings accompanying this specification: Figure 1 shows the complete cable terminal device, the cable being broken away on either side, and the jumper wires from the tapped cable conductors appearing loosely from the lower side of the cylindrical cover; Fig. 2 shows a pole top of typical aerial construction, equipped with a cable terminal according to my invention, there being shown also in the drawing portions of two spans of lead-covered cable and supporting messenger wire, a cross-arm with insulators, and three pairs of service drop-wires, with loose jumpers from the insulators into the cable terminal; Figs. 3, 4 and 5 show a structural part required in the building of a cable terminal according to my invention, being the equivalent of a split lead sleeve for an ordinary cable splice, but with terminals added; three views of the same part are shown; Figs. 6 and 7 show face and edge views of a terminal block for terminating the jumper wires leading out from the cable terminal; Figs. 8 and 9 show face and edge views of an iron end piece, of which four are used in building up a cable terminal according to my invention, as subsequently described; Fig. 10 shows a stage in the preparation of a cable for terminating a number of its conductors according to my invention, the installation of the cable terminal in this instance being made without cutting any of the conductors of the cable; Fig. 11 shows a stage in the preparation for the installation of a cable terminal according to my invention, the installation being made at the junction between two cables of unequal sizes, some of the conductors of the larger cable tapping out to the cable terminal and passing on into the smaller cable, and some of the conductors of the larger cable terminating in the cable terminal; Fig. 12 shows detail of a wooden tool used in forming wires as shown in Fig. 10; Figs. 13 and 14 show two views of an end seal, of lead, used in the construction of the cable terminal according to my invention; Fig. 15 shows a section through a completed cable terminal according to my invention, and Fig. 16 shows a cross section of the same.

In general, my invention has for its object the making of a cable splice with terminals mounted in the sleeve thereof, the terminals thus mounted being then protected from the weather by a suitable housing, and the conductors within the cable protected from undue electrical conditions by proper fuses conveniently mounted within the protecting housing. Where the cable is not to be spliced, I propose to strip the lead sheath from the cable at a selected point and replace it with a sleeve in which the terminals are mounted.

In the case of installing a cable terminal according to my invention where the cable conductors are not to be opened at the terminal, the process would be as follows, the description and drawings being shown for a terminal accommodating ten conductors and placed upon a cable having a greater number of conductors, as perhaps thirty, sixty, or one hundred.

The lead sheath first is removed, exposing the insulated cable conductors; the ends of the sheath then are tapped in the manner usual when proceeding to make a splice. The pairs to be connected to the terminals then may be tested out and tagged. Some slack must be pulled into the cable, say one inch, for the size of cable here contemplated, and all conductors of the cable then are formed to take up this slack, the formation being that shown in Fig. 10, which shows this stage of the process; those conductors to be tapped to the terminals are formed into protruding loops as shown in typical conductor 1, while those conductors not to be tapped out have the slack taken up by being bent or formed into the shape as shown in typical conductor 2, this kink in the conductor being obtainable by bending with the fingers or with a forked stick of the general shape shown in Fig. 12. The conductors thus prepared may be boiled out in the usual manner in cable splicing and may be tapped up as in splicing, permitting the tapping loops to remain outside the wrapping; the insulation of the conductors in the tapping loops is removed for half an inch from the central portion of each of the loops; the work now will present an appearance similar to that of part 30 in Fig. 15. The next step is the installation of the split sleeve and its terminals. This part is shown in detail in Figs. 3, 4 and 5, Fig. 3 showing the inside face of a strip of lead, 3, and the inside connectors of the terminals mounted thereupon; Fig. 4 shows an edge view of the same, and Fig. 5 shows the outside face of the strip of lead and the outer connectors of the terminals. In the case of the ten-conductor terminal herein illustrated, the strip of lead 3, is perforated with twelve holes, one for each of the ten conductors to be tapped out and two for screws or bolts for clamping the terminal plates in place on the lead strip. Two plates of insulating material 4 and 5, perforated for terminals and for clamping bolts, are cemented to the lead strip with the said perforations coinciding with the homologous perforations of the lead strip, the insulating plates being cemented to the lead strip to form a moisture-proof seal, and being further secured by two bolts 6, 6, which bolts also project beyond the outer insulating plate for the attachment of parts of the protecting housing. The outer plate 5 is wider than the inner plate 4, and has ten additional holes 32, for fuse wires leading from the terminals. Each of the conductor terminals is provided on the inner side of the lead strip with a hook-like solder clip 7, and on the outer side of the lead strip with suitable clamping means, as the nut 8, for holding a fuse wire or other conductor. The perforations in the lead sheath are made larger than the bolts which form the conductor terminals, so that a clearance will be left between the conductor bolts and the lead strip to provide for the necessary insulation of the terminals. A strip of flexible sheet asbestos 9, of length approximately the same as the lead sheet but conveniently narrower, is clamped under the insulating plate 5, and is adapted to form an outer covering for the lead strip. This is shown in Figs. 4, 5, 15 and 16. In the installation of this lead strip, or split sleeve, the looped-out and skinned conductors are hooked upon the solder clips of the terminals and soldered; then the lead strip is bent around the cable and its ends are soldered together, forming a tubular sleeve; then the ends of the sleeve are hammered in and wiped, as in an ordinary cable splice; the asbestos strip 9 then is wrapped around the sleeve 3, and the ends sewed together; the sleeve is now complete as shown in Figs. 15 and 16, the solder of the wipe joints being shown at 10 in Fig. 15.

There remains to build the protecting housing around the terminals, and to provide additional terminals, if desired. Four pieces 11, as shown in Figs. 8 and 9, are used. These may be of cast or sheet metal, each piece being semi-annular and with three projecting lugs, 12, 13, 13; the lugs project at right angles to the body of the part, and each lug is drilled for a bolt. Two such pieces 11, are placed upon the two projecting bolts 6, 6, of the split-sleeve terminal block 5; thus they encircle the upper half of the split sleeve 3; the remaining two pieces 11' are attached to the jumper-terminal block 14, by its two end bolts 6', 6', loosely, and then are placed in position encircling the lower half of the split sleeve 3; in this position, the lugs 13, 13, 13, 13, of the parts 11 and 11, register with the lugs 13, 13, 13, 13, of the parts 11' and 11', and bolts 6'', of which there are four in all, are passed through; the nuts on all bolts 6, 6, 6', 6', 6'', 6'', 6'', 6'', now are tightened and the end circles or flanges are in place.

The jumper-terminal block 14, is similar to the part 5, and the terminals upon it are similar to those mounted upon the block 5; the jumper wires 18, 18, are passed through this block and clamped or soldered in place before the jumper-terminal block 14 is built into its final position.

Two split caps, Fig. 13, of sheet lead, are placed over the end rings at 15 and 15', the edges are hammered over as at 16 in Fig. 15, to clamp the end rings, the lips 17, 17, of the slit which permitted the end cap to be passed around the cable are soldered together, and the end caps are wiped to the cable sheath, the solder of this second wipe joint being shown in Figs. 1 and 15 at 17', 17'. Fuse wires, as 19, 19, now may be installed, each fuse wire passing from a clamp terminal on the split-sleeve terminal block, through the adjacent hole 32, in that terminal block, thence through the corresponding hole in the jumper terminal block to the clamp terminal to which the jumper wire is connected; thus the cable conductor is connected to the jumper wire, and protection is provided for the cable conductor against currents of undue strength.

The installation of the device is completed by placing the sheet-metal cover, 20, over the terminal and clamping the end circles or flanges, and hooking it to the messenger wire supporting the cable. This cover, 20, is in the form of a split cylinder, with edges turned back as shown at 21, to provide a slot-like exit for the jumper wires on the under side of the cylinder; it is provided with a pair of clamping screws 22, 22, operating in lugs to draw the cover tightly around the terminal, and it is provided also with a pair of hooks, 23, 23, by which it may be hung to the messenger strand, thus supporting the entire terminal upon the strand which supports the cable.

The process under modified conditions is illustrated in Fig. 11, where cable 24 has a greater number of conductors than cable 25, some of the conductors of cable 24 terminating in the cable terminal device, as shown in conductor 26. Other conductors as 27 and 28, are spliced in the usual manner and pass from the larger into the smaller cable, while still other conductors, as 29 and 31, not only pass into the smaller cable but also are tapped out into the terminals. After the conductors are disposed of by being spliced or laid out for terminals as shown, the splice is finished in accordance with all the principles of the work following that condition shown in Fig. 10.

I do not wish to limit myself in all respects to the exact details herein shown and described, as I understand that many modifications may be made without departing from the spirit or scope of my invention.

Having thus described my invention, what I claim as new and desire to secure by United States Letters Patent is:

1. In a cable terminal, a sealed sleeve for a median section of a cable, said sleeve containing insulated conductor terminals mounted therethrough; flanges mounted upon said sleeve upon either side of said terminals; weather shields extending from said flanges to the cable sheath on either side of said sleeve; and a cover split lengthwise and clamped upon said flanges to house said terminals, said cover being formed at its edges to provide an exit from said housing for conductors, substantially as described.

2. In a cable terminal, a sealed sleeve for a median section of a cable, said sleeve containing insulated conductor terminals mounted therethrough; flanges mounted upon said sleeve upon either side of said terminals; weather shields extending from the periphery of said flanges to the cable sheath on either side of said sleeve; and a cover split lengthwise and clamped upon said flanges to house said terminals, said cover being formed at its edges to provide an exit from said housing for conductors, substantially as described.

3. In a cable terminal, a sealed sleeve for a median section of a cable, said sleeve containing insulated conductor terminals mounted therethrough; flanges mounted upon said sleeve upon either side of said terminals; weather shields extending from said flanges to the cable sheath on either side of said sleeve and united with the sheath by a soldered or weatherproof joint; and a cover split lengthwise and clamped upon said flanges to house said terminals, said cover being formed at its edges to provide an exit from said housing for conductors, substantially as described.

4. In a cable terminal, a sealed sleeve for a median section of a cable, said sleeve containing insulated conductor terminals mounted therethrough; flanges mounted upon said sleeve upon either side of said terminals; weather shields extending from said flanges to the cable sheath on either side of said sleeve; a cover split lengthwise and clamped upon said flanges to house said terminals, said cover being formed at its edges to provide an exit from said housing for conductors, and suspension hooks upon said cover on the side opposite the exit, substantially as described.

5. In a cable terminal, a sealed sleeve for a median section of a cable, said sleeve containing a set of insulated conductor terminals mounted therethrough; flanges mounted upon said sleeve upon either side of said terminals; a second set of insulated terminal posts, supported by said flanges; and a cover split lengthwise and clamped upon said flanges and forming a housing for both sets of terminal posts, the edges of said cover being formed to leave an opening in said housing for exit of jumper wires attached to said terminal posts, substantially as described.

6. In a cable terminal, a sealed sleeve for a median section of a cable, said sleeve containing a set of insulated conductor terminals mounted therethrough; flanges mounted upon said sleeve upon either side of said terminals; a second set of insulated terminal posts supported by said flanges; a cover split lengthwise and clamped upon said flanges and forming a housing for both sets of terminal posts, the edges of said cover being formed to leave an opening in said housing for exit of jumper wires attached to said terminal posts; and suspension hooks upon said cover on the side opposite the exit, substantially as described.

7. In a cable terminal, a sealed sleeve for a median section of a cable, said sleeve containing a set of insulated conductor terminals mounted therethrough; flanges mounted upon said sleeve upon either side of said terminals; a second set of insulated terminal posts supported by said flanges; a cover split lengthwise and clamped upon said flanges and forming a housing for both sets of terminal posts, the edges of said cover being formed to leave an opening in said housing for exit of jumper wires attached to said terminal posts; and said cover being so positioned upon said flanges as to position the exit opening near the second set of terminals, substantially as described.

8. In a cable terminal, a sealed sleeve for a median section of a cable, said sleeve containing a set of insulated conductor terminals mounted therethrough; flanges mounted upon said sleeve upon either side of said terminals; a second set of insulated terminal posts supported by said flanges; fuse conductors extending between terminals of said first set and terminals of said second set; and a cover split lengthwise and clamped upon said flanges and forming a housing for both sets of terminal posts, the edges of said cover being formed to leave an opening in said housing for exit of jumper wires attached to said terminal posts, substantially as described.

9. In a cable terminal, a sealed sleeve for a median section of a cable, said sleeve containing a set of insulated conductor terminals mounted therethrough; flanges mounted upon said sleeve upon either side of said terminals; a second set of insulated terminal posts supported by said flanges, and positioned at and beyond the opposite side of the said sleeve from the first set of terminals; fuse conductors extending between terminals of said first set and terminals of said second set; a cover split lengthwise and clamped upon said flanges and forming a housing for both sets of terminal posts, the edges of said cover being formed to leave an opening in said housing for exit of jumper wires attached to said terminal posts; and said cover being so positioned upon said flanges as to position the exit opening near the second set of terminals, substantially as described.

10. In a cable terminal, a sealed sleeve for a median section of a cable, said sleeve containing a set of insulated conductor terminals mounted therethrough; flanges mounted upon said sleeve upon either side of said terminals; a second set of insulated terminal posts supported by said flanges; and positioned at and beyond the opposite side of the said sleeve from the first set of terminals; fuse conductors extending between terminals of said first set and terminals of said second set; a cover split lengthwise and clamped upon said flanges and forming a housing for both sets of terminal posts, the edges of said cover being formed to leave an opening in said housing for exit of jumper wires attached to said terminal posts; said cover being so positioned upon said flanges as to position the exit opening near the second set of terminals; and suspension hooks upon said cover on the side opposite the exit, substantially as described.

11. In a cable terminal, a sealed sheath for the cable containing insulated terminals therein for connection with the cable conductors; flanges upon said sheath on either side of said terminals; a cylindrical cover split lengthwise and adapted when clamped upon said flanges to form a housing for said terminals; clamping devices upon said housing near its edges and adapted to draw the edges toward each other and to clamp the housing upon the flanges, said edges being formed to provide an opening through said housing for the exit of conductors from said terminals when said housing is clamped upon said flanges; and suspension hooks upon said housing, said hooks being adapted to engage a messenger wire and being located upon said housing in such relative position to the edges of said housing as to maintain said housing with the opening for conductors on the under side of the cylindrical housing, substantially as described.

Signed by me at Galesburg, county of Knox and State of Illinois, in the presence of two witnesses.

JAMES E. McMEEN.

Witnesses:
J. E. CAMPBELL,
W. A. ROBBINS.